(12) United States Patent
Huang et al.

(10) Patent No.: US 11,436,494 B1
(45) Date of Patent: Sep. 6, 2022

(54) OPTIMAL POWER FLOW COMPUTATION METHOD BASED ON MULTI-TASK DEEP LEARNING

(71) Applicant: Zhejiang Lab, Zhejiang (CN)

(72) Inventors: Gang Huang, Zhejiang (CN); Longfei Liao, Zhejiang (CN); Wei Hua, Zhejiang (CN)

(73) Assignee: Zhejiang Lab, Zhejiang (CN)

( * ) Notice: Subject to any disclaimer, the term of this patent is extended or adjusted under 35 U.S.C. 154(b) by 0 days.

(21) Appl. No.: 17/717,121

(22) Filed: Apr. 10, 2022

(30) Foreign Application Priority Data

Jul. 21, 2021 (CN) .......................... 202110826171.X

(51) Int. Cl.
| | |
|---|---|
| *H02J 13/00* | (2006.01) |
| *H02J 4/00* | (2006.01) |
| *G06N 3/08* | (2006.01) |
| *G06K 9/62* | (2022.01) |
| *G06N 3/04* | (2006.01) |

(52) U.S. Cl.
CPC ............. *G06N 3/08* (2013.01); *G06K 9/6256* (2013.01); *G06N 3/04* (2013.01); *H02J 13/00002* (2020.01); *H02J 4/00* (2013.01)

(58) Field of Classification Search
None
See application file for complete search history.

*Primary Examiner* — Michael J Huntley
*Assistant Examiner* — Peter D Coughlan
(74) *Attorney, Agent, or Firm* — JCIPRNET

(57) ABSTRACT

An optimal power flow computation method based on multi-task deep learning is provided, which is related to the field of smart power grids. The optimal power flow computation method based on multi-task deep learning includes: acquiring state data of a power grid at a certain dispatching moment, and amplifying collected data samples by means of sampling to acquire training data; applying an optimization method to acquire dispatching solutions of the power grid in different sampling states, and acquiring labels; designing a deep learning neural network model, learning feasibility and an optimal solution of an optimal power flow computation problem separately, and outputting a feasibility determination and an optimal solution prediction; simultaneously training, tasks of the feasibility determination and the optimal solution prediction in the optimal power flow computation problem; and determining whether there is a feasible dispatching solution, and outputting an optimal dispatching solution or an early warning.

3 Claims, 1 Drawing Sheet

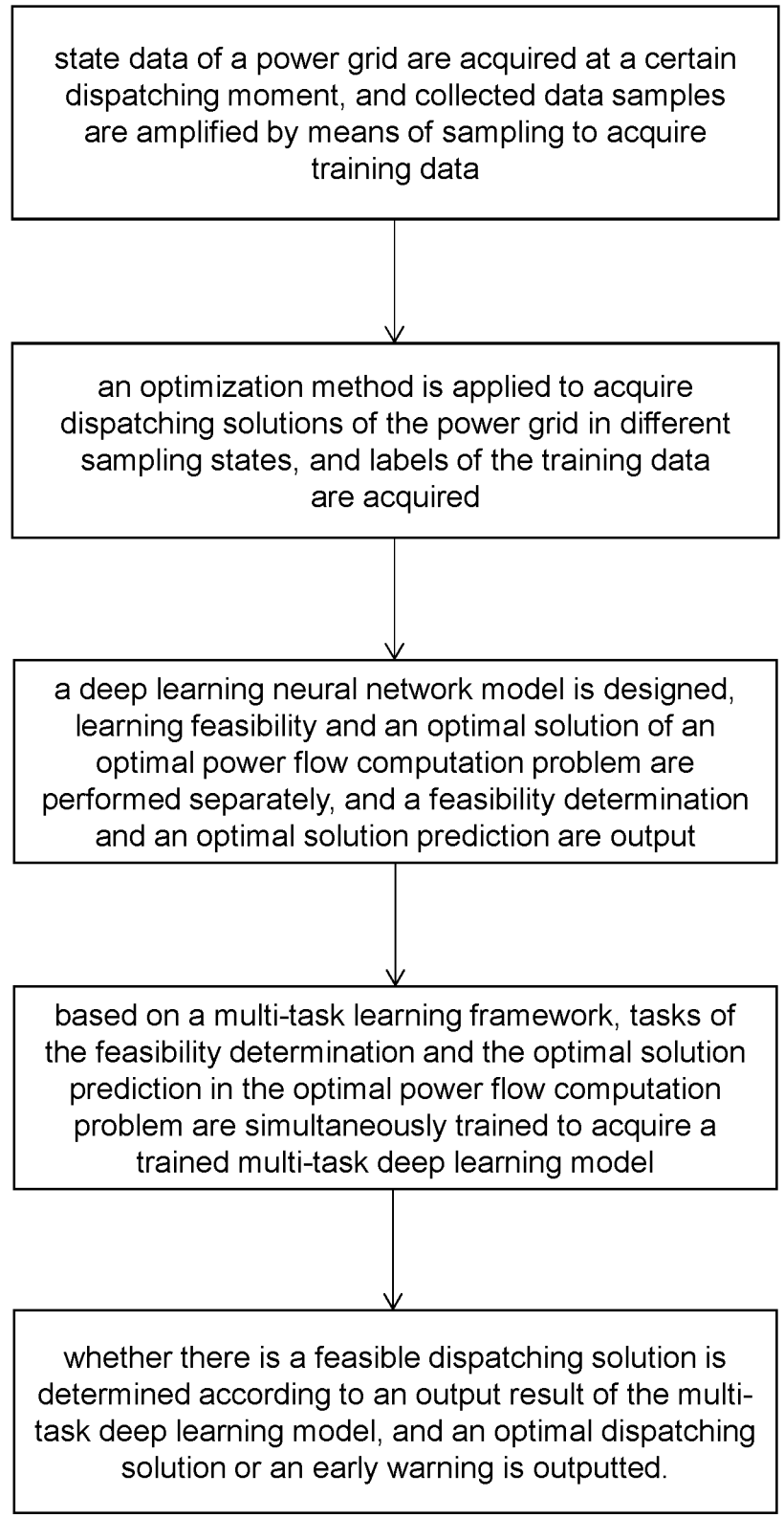

OPTIMAL POWER FLOW COMPUTATION METHOD BASED ON MULTI-TASK DEEP LEARNING

CROSS-REFERENCE TO RELATED APPLICATION

This application claims the priority benefit of China application serial no. 202110826171.X filed on Jul. 21, 2021. The entirety of the above-mentioned patent application is hereby incorporated by reference herein and made a part of this specification.

BACKGROUND

Technical Field

The disclosure relates to the field of smart power grids and artificial intelligence, in particular to an optimal power flow computation method based on multi-task deep learning.

Description of Related Art

The optimal power flow computation method is the core for operation of a power system, and supports various applications of the power system, including economic dispatch, unit commitment, demand response, reliability evaluation, etc. Under the premise of abidance by physical constraints, the power system can achieve optimal generation dispatch by optimal power flow computation. Related to a mathematical programming, optimal power flow computation is diverse, generally including direct current (DC) optimal power flow computation and alternating current (AC) optimal power flow computation. Traditional solution methods are numerical algorithms based on an optimization theory, such as a gradient method, a Newton method and an interior point method. Generally speaking, the traditional methods can be better used for acquiring an optimal solution, and can meet requirements from a general power system. However, due to high time complexity and long computation processes of a numerical algorithm based on the optimization theory, it is difficult to meet the requirements of large-scale power systems, and real-time performance of solution cannot be guaranteed. How to guarantee solution effect of optimal power flow computation and shorten time spent during solution is one of main concerns in the field of smart power grids at present.

SUMMARY

An objective of the present disclosure is to solve the technical problem in the field of smart power grids, and provide an optimal power flow computation method based on multi-task deep learning.

The present disclosure is implemented by the following technical solution:

the optimal power flow computation method based on multi-task deep learning includes the following steps:

step 1, acquiring state data of a power grid at a certain dispatching moment, and amplifying collected data samples by means of sampling to acquire training data;

step 2, applying an optimization method to acquire dispatching solutions of the power grid in different sampling states, and acquiring labels of the training data;

step 3, designing a deep learning neural network model, learning feasibility and an optimal solution of an optimal power flow computation problem separately, and outputting a feasibility determination and an optimal solution prediction;

step 4, simultaneously training, based on a multi-task learning framework, tasks of the feasibility determination and the optimal solution prediction in the optimal power flow computation problem to acquire a trained multi-task deep learning model; and step 5, determining whether there is a feasible dispatching solution of the power grid according to an output result of the multi-task deep learning model, and outputting an optimal dispatching solution or an early warning of the power grid.

Further, step 1 specifically includes:

in step 1.1, collecting the state data of the power grid at a certain dispatching moment, the state data including the number $N_{bus}$ of nodes, the number $N_{gen}$ of generators, the number $N_{branch}$ of lines, and a reactance $x_{ij}$ and load power $p_D = [p_{d_1}, p_{d_2}, \ldots, p_{d_{N_{bus}}}]$ between node i and node j in a system, and $p_{d_i}$ being load power of a corresponding node i;

in step 1.2, performing sampling and amplification on the collected node load power $p_d i$ to acquire a sample value $\hat{p}_D = [\hat{p}_{d_1}, \hat{p}_{d_2}, \ldots \hat{p}_{d_{N_{bus}}}]$;

and repeating the sampling and amplification for n times to acquire a training sample value $\hat{P}_D = [\hat{p}_{D_1}, \hat{p}_{D_2}, \ldots, \hat{p}_{D_n}]$.

Further, the sampling method is used for uniform sampling with the node load power $p_{d_i}$ as a center as shown below:

$$\hat{p}_{d_i} \in [(1-r_{d_i}) \times p_{d_i}, (1+r_{d_i}) \times p_{d_i}],$$

where $r_{d_i}$ is a sampling parameter of the node i.

Further, step 2 specifically includes:

taking the training sample $\hat{p}_{D_i}$ as an input, outputting a corresponding feasibility sign $\hat{f}_{G_i}$ and a dispatching solution $\hat{p}_{G_i} = [\hat{p}_{g_1}, \hat{p}_{g_2}, \ldots, \hat{p}_{g_{N_{gen}}}]$ by means of a traditional optimal power flow solver based on the optimization method; repeating the above process for each training sample to acquire corresponding labels $\hat{P}_G = [\hat{p}_{G_1}, \hat{p}_{G_2}, \ldots, \hat{p}_{G_n}]$ and $\hat{F}_G = [\hat{f}_{G_1}, \hat{f}_{G_2}, \ldots, \hat{f}_{G_n}]$ of all training data.

Further, step 3 specifically includes:

preprocessing the input $\hat{P}_D$ and output $\hat{P}_G$ of the training data to acquire preprocessed input $\tilde{P}_D$ and output $\tilde{P}_G$ of the training data;

inputting $\tilde{P}_D$ into the following deep learning neural network:

$$h_0 = \tilde{P}_D$$

$$h_i = \Phi(W_i h_{i-1} + b_i),$$

where $h_0$ represents an original input of the neural network model, $h_i$ represents an output of a ith hidden layer of the model, $W_i$ represents a weight of the ith hidden layer, $b_i$ represents a deviation of the ith hidden layer and $\Phi(\cdot)$ represents an activation function;

designing, aiming at the feasibility of the optimal power flow computation problem, the following output layer for learning:

$$F_G = \Psi^{cls}(W_l^{cls} h_{l-1} + b_l^{cls})),$$

where $\Psi^{cls}$ represents an activation function, $F_G$ represents a predicted value of the feasibility sign, $h_{l-1}$ represents an output of a last hidden layer, $W_l^{cls}$ is represents an output layer weight of a classification problem and $b_l^{cls}$ represents an output layer deviation of the classification problem; and designing, aiming at the optimal solution of the optimal power flow computation problem, the following output layer for learning:

$$P_G = \Psi^{reg}(W_l^{reg} h_{l-1} + b_l^{reg}),$$

where $\Psi^{reg}$ represents an activation function, $P_G$ represents a predicted value of the dispatching solution, $h_{l-1}$ represents an output of the last hidden layer, $W_l^{reg}$ represents an output layer weight of a regression problem and $b_l^{reg}$ represents an output layer deviation of the regression problem.

Further, step 4 specifically includes:

setting a classification task, and measuring a difference between the predicted value $F_G$ and a true value $\hat{F}_G$ of the feasibility sign by means of a loss function:

$$\text{loss}_{cls} = L^{cls}(F_G, \hat{F}_G)$$

where $L^{cls}$ represents the loss function of the classification task;

setting a regression task, and measuring a difference between the predicted value $P_G$ and a true value $\tilde{P}_G$ of the dispatching solution by means of the loss function:

$$\text{loss}_{reg} = L^{reg}(p_G, \tilde{P}_G)$$

where $L^{reg}$ represents the loss function of the classification task;

acquiring a training loss of the multi-task deep learning model by means of weighted summation:

$$\text{loss} = \omega_{cls} \cdot \text{loss}_{cls} + \omega_{reg} \cdot \text{loss}_{reg}$$

where $\omega_{cls}$ and $\omega_{reg}$ represent a weight of a classification task loss and a weight of a regression task loss respectively.

Further, step 5 specifically includes:

for given state data of the power grid at any dispatching moment, outputting, by the multi-task deep learning model, the predicted value $f_G$ of the feasibility sign and a predicted value $p_G$ of the optimal solution; determining whether the predicted value $p_G$ is effective on the basis of the predicted value $f_G$; if so, taking the output predicted value $p_G$ of the optimal solution as an optimal dispatching solution to guide dispatching operation of the power grid; otherwise, abandoning the predicted value $p_G$, and outputting the early warning about the fact that power grid cannot operate normally in a current system state.

Compared with the prior art, the present disclosure has the following advantages:

In the present disclosure, in order to solve the problems that the traditional optimization method takes a long time to solve the optimal power flow computation problem, the optimal power flow computation method based on multi-task deep learning is innovatively proposed, and the neural network model is used for modeling the optimal power flow computation problem instead of the traditional method, such that the acquired neural network model may quickly solve the optimal power flow computation problem and better meet the requirements from large-scale power systems.

In the present disclosure, in order to guarantee the effectiveness and the feasibility of the model in solving the optimal power flow computation problem, the multi-task training framework is designed to train the neural network model. The regression task is designed to achieve the output of the optimal dispatching solution, and the classification task is designed to determine the feasibility of the solution. Finally, the trained model may not only accurately solve the optimal power flow problem, but also give a warning that there is no optimal solution.

BRIEF DESCRIPTION OF THE DRAWINGS

FIGURE is a flowchart of an optimal power flow computation method based on multi-task deep learning in an embodiment of the present disclosure.

DESCRIPTION OF THE EMBODIMENTS

The present disclosure will be described in details below with reference to accompanying drawings and in conjunction with embodiments. It should be understood that the described embodiments are merely some rather than all of embodiments, the present disclosure should not be limited by the illustrated embodiments when implemented, but the essence of contents of the present disclosure should be further understood by means of these embodiments, so as to better serve those of ordinary skill in the art.

As shown in FIGURE, the optimal power flow computation method based on multi-task deep learning of the present disclosure includes:

Step 1, state data of a power grid are acquired at a certain dispatching moment, and collected data samples are amplified by means of sampling to acquire training data.

In step 1.1, the state data of the power grid are collected at a certain dispatching moment, the state data including the number $N_{bus}$ of nodes, the number $N_{gen}$ of generators, the number $N_{branch}$ of lines, a reactance $x_{ij}$ and load power $p_D = [p_{d_1}, p_{d_2}, \ldots,$ $$p_{d_{N_{bus}}}]$$

between node i and node j in a system, and $p_{d_i}$ being load power of a corresponding node i. Specifically, the sampling method is used for uniform sampling with the node load power $p_{d_i}$ as a center as shown below:

$$\hat{p}_{d_i} \in [(1-r_{d_i}) \times p_{d_i}, (1+r_{d_i}) \times p_{d_i}],$$

where $r_{d_i}$ is a sampling parameter of the node i.

In this embodiment, dispatching data of an IEEE 30-bus power grid at a certain moment are collected and specifically include the number $N_{bus}=30$ of nodes, the number $N_{gen}=6$ of generators, the number $N_{branch}=41$ of lines, and a reactance $x_{ij}$ and load power $p_D[p_{d_1}, p_{d_2}, \ldots, p_{d_{30}}]$ between node i and node j in a system.

in step 1.2, performing sampling and amplification on the collected node load power $p_d i$ to acquire a sample $\hat{p}_D = [\hat{p}_{d_1}, \hat{p}_{d_2}, \ldots,$ $$\hat{p}_{d_{N_{bus}}}];$$

and repeating the sampling and amplification for n times to acquire a training sample $\hat{P}_D = [\hat{p}_{D_1}, \hat{p}_{D_2}, \ldots, P_{D_n}]$.

In this embodiment, uniform sampling is used for sample amplification on collected state data of the IEEE 30-bus power grid. In this embodiment, the sample $\hat{p}_D = [\hat{p}_{d_1}, \hat{p}_{d_2}, \ldots, \hat{p}_{d_{30}}]$ can be acquired by sampling with $r_{d_i}$ being 0.5. The above sampling is repeated for 10,000 times, and finally the training sample $\hat{P}_{D_{10000}} = [\hat{p}_{D_1}, \hat{p}_{D_2}, \ldots, \hat{p}_{D_{10000}}]$ is acquired.

step 2, an optimization method is applied to acquire dispatching solutions of the power grid in different sampling states, and labels of the training data are acquired. Specifically, the training sample value $\hat{p}_{D_i}$ is taken as an input, a corresponding feasibility sign $\hat{f}_{G_i}$ and a dispatching solution $\hat{p}_{G_i} = [\hat{p}_{g_1}, \hat{p}_{g_2}, \ldots,$ $$\hat{p}_{g_{N_{gen}}}]$$

are output by means of a traditional optimal power flow solver based on the optimization method. The above process is repeated for each training sample to acquire corresponding labels $\hat{P}_G = [\hat{p}_{G_1}, \hat{p}_{G_2}, \ldots, \hat{p}_{G_n}]$ and $\hat{F}_G = [\hat{f}_{G_1}, \hat{f}_{G_2}, \ldots, \hat{f}_{G_n}]$ of all training data. When $\hat{f}_{G_i} = 0$, it means that there is no feasible solution in a current state, when $\hat{f}_{G_i} = 1$, it means that there is a feasible solution in the current state, $\hat{p}_{G_i}$ is a dispatching solution obtained in an interior point method, when $\hat{f}_{G_i} = 1$ (there is a feasible solution), $\hat{p}_{G_i}$ is not all-zero vector; and when $\hat{f}_{G_i} = 0$ (there is no feasible solution), $\hat{p}_{G_i}$ is an all-zero vector.

In this embodiment, the above solving process is repeated for each training sample to acquire corresponding labels $\hat{P}_G$ [$\hat{p}_{G_1}, \hat{p}_{G_2}, \hat{p}_{G_{100000}}$] and $\hat{F}_G = [\hat{f}_{G_1}, \hat{f}_{G_2}, \ldots, \hat{f}_{G_{10000}}]$ of all the training data.

Step 3, a deep learning neural network model is designed, learning feasibility and an optimal solution of an optimal power flow computation problem are performed separately, and a feasibility determination and an optimal solution prediction are output.

Firstly, the input $\hat{P}_D$ and output $\hat{P}_G$ of the training data are preprocessed to acquire preprocessed input $\tilde{P}_D$ and output $\tilde{P}_G$ of the training data.

Then $\tilde{P}_D$ is input into the following deep learning neural network:

$$h_0 = \tilde{P}_D$$

$$h_i = \Phi(W_i h_{i-1} + b_i),$$

where $h_0$ represents an original input of the neural network model, $h_i$ represents an output of a ith hidden layer of the model, $W_i$ represents a weight of the ith hidden layer, $b_i$ represents a deviation of the ith hidden layer and $\Phi(\bullet)$ represents an activation function.

Aiming at the feasibility of the optimal power flow computation problem, the following output layer is designed for learning:

$$F_G = \Psi^{cls}(W_l^{cls} h_{l-1} + b_l^{cls})),$$

where $\Psi^{cls}$ represents an activation function, $F_G$ represents a predicted value of the feasibility sign, $h_{l-1}$ represents an output of a last hidden layer, $W_l^{cls}$ represents an output layer weight of a classification problem and $b_l^{cls}$ represents an output layer deviation of the classification problem.

Aiming at the optimal solution of the optimal power flow computation problem, the following output layer is designed for learning:

$$P_G = \Psi^{reg}(W_l^{reg} h_{l-1} + b_l^{reg}),$$

where $\Psi^{reg}$ represents an activation function, $P_G$ represents a predicted value of the dispatching solution, $h_{l-1}$ represents an output of the last hidden layer, $W_l^{reg}$ represents an output layer weight of a regression problem and $b_l^{reg}$ represents an output layer deviation of the regression problem.

In this embodiment, in order to reduce influence of an amplitude range of the training data on results, the input $\hat{P}_D$ and the output $\hat{P}_G$ of the training data are normalized such that the amplitude thereof is between 0 and 1, and the normalized input and the normalized output of the training data are $\tilde{P}_D$ and $\tilde{P}_G$ respectively.

Then $\tilde{P}_D$ is input into the deep learning neural network model, and the model structure is shown below:

$$h_0 = \tilde{P}_D$$

$$h_i = \text{ReLU}(W_i h_{i-1} + b_i),$$

where $h_0$ represents an original input of the neural network model, $h_i$ represents an output of a ith hidden layer of the model, $W_i$ represents a weight of the ith hidden layer, $b_i$ represents a deviation of the ith hidden layer and ReLU($\bullet$) represents an activation function. The number of layers of neural networks used in this embodiment is 4.

Aiming at the feasibility of the optimal power flow computation problem, an output layer of the neural network model outputs the predicted value $F_G$ of the feasibility sign:

$$F_G = \text{argmax}(\text{Softmax}(W_l^{cls} h_{l-1} + b_l^{cls})),$$

where Softmax outputs a probability value of feasibility/infeasibility of the problem, and argmax returns the predicted value $F_G$, with a value being 0 or 1, of the feasibility label based on the probability value.

Aiming at the optimal solution of the optimal power flow computation problem, the output layer of the neural network model outputs a prediction result $P_G$:

$$P_G = \text{Sigmoid}(W_l^{reg} h_{l-1} + b_l^{reg}),$$

where $P_G$ is a numerical value within (0,1), that is, the predicted value of the optimal solution $\tilde{P}_G$.

Step 4, based on a multi-task learning framework, tasks of the feasibility determination and the optimal solution prediction in the optimal power flow computation problem are simultaneously trained to acquire a trained multi-task deep learning model. Specifically, a classification task is set, and a difference between the predicted value $F_G$ and a true value $\hat{F}_G$ of the feasibility sign is measured by means of a loss function as shown below:

$$\text{loss}_{cls} = L^{cls}(F_G, \hat{F}_G)$$

where $L^{cls}$ represents the loss function of the classification task.

A regression task is set, and a difference between the predicted value $P_G$ and a true value $\tilde{P}_G$ of the dispatching solution is measured by means of the loss function as show below:

$$\text{loss}_{reg} = L^{reg}(P_G, \tilde{P}_G)$$

where $L^{reg}$ represents the loss function of the classification task.

A training loss of the multi-task deep learning model is acquired by means of weighted summation as shown below:

$$\text{loss} = \omega_{cls} \cdot \text{loss}_{cls} + \omega_{reg} \cdot \text{loss}_{reg}$$

where $\omega_{cls}$ and $\omega_{reg}$ represent a weight of a classification task loss and a weight of a regression task loss respectively. The multi-task deep learning model achieves simultaneous learning of the feasibility determination and the optimal solution prediction by continuously optimizing the above loss function value.

In this embodiment, two training tasks are set to train the neural network model in step 3.

The classification task is set, and classification involves 2 categories, where category 0 represents infeasibility and category 1 represents feasibility. The difference between the predicted value $F_G$ and the true value $\hat{F}_G$ of the model feasibility label is minimized by using a cross entropy loss function as shown below:

$$loss_{cls} = CrossEntropyLoss(F_G, \hat{F}_G)$$

The regression task is set, and a mean square error loss function is used to minimize a difference between the predicted optimal solution $P_G$ and a true value $\tilde{P}_G$ of the model as shown below:

$$loss_{reg} = MSELoss(P_G, \tilde{P}_G)$$

A training loss of the multi-task deep learning model is acquired by means of weighted summation as shown below:

$$loss = \omega_{cls} \cdot loss_{cls} + \omega_{reg} \cdot loss_{reg}$$

where $\omega_{cls}$ and $\omega_{reg}$ represent a weight of a classification task loss and a weight of a regression task loss respectively, and $\omega_{cls}$ is 0.1 and $\omega_{reg}$ is 1 in this embodiment. The neural network model achieves simultaneous learning of the feasibility determination and the optimal solution prediction by continuously optimizing the above loss function value.

The neural network model uses the multi-task learning framework above to train on the training set $\tilde{P}_D$ and its corresponding labels $\tilde{P}_G$ and $\hat{F}_G$, and sets batch size to 128, a learning rate to 0.001, and the number of iterations to 200.

Step 5, whether there is a feasible dispatching solution depends on an output result of the multi-task deep learning model, and an optimal dispatching solution or an early warning is outputted. The trained multi-task deep learning model is acquired in step 4 and is deployed and used. During the use of the model, for given state data of the power grid at any dispatching moment, the multi-task deep learning model outputs the predicted value $f_G$ of the feasibility sign and a predicted value $p_G$ of the optimal solution. Whether the predicted value $p_G$ is effective is determined on the basis of the predicted value $f_G$, if so, the output predicted value $p_G$ of the optimal solution is taken as an optimal dispatching solution to guide dispatching operation of the power grid; otherwise, the predicted value $p_G$ is abandoned, and the early warning about the fact that power grid may not operate normally in a current system state is outputted.

In this embodiment, when $f_G=1$, the output predicted value $p_G$ of the optimal solution is the optimal dispatching solution, which may guide the dispatching operation of the power grid. When $f_G=0$, the output predicted value $p_G$ of the optimal solution has no practical significance, and $f_G=0$ is deemed as the early warning that the power grid may not operate normally in the current system state.

What is claimed is:

1. An optimal power flow computation method based on a multi-task deep learning, comprising:
   step 1, acquiring state data of a power grid at a certain dispatching moment, and amplifying collected data samples by a sampling method to acquire training data;
   step 2, applying an optimization method to acquire dispatching solutions of the power grid in different sampling states, and acquiring labels of the training data;
   step 3, designing a deep learning neural network model, learning a feasibility and an optimal solution of an optimal power flow computation problem separately, and outputting a feasibility determination and an optimal solution prediction;
   step 4, simultaneously training, based on a multi-task learning framework, tasks of the feasibility determination and the optimal solution prediction in the optimal power flow computation problem to acquire a multi-task deep learning model, which is trained; and
   step 5, determining whether there is a feasible dispatching solution of the power grid according to an output result of the multi-task deep learning model, and outputting an optimal dispatching solution or an early warning of the power grid; wherein
   step 1 specifically comprises:
   in step 1.1, collecting the state data of the power grid at the certain dispatching moment, the state data including the number $N_{bus}$ of nodes, the number $N_{gem}$ of generators, the number $N_{branch}$ of lines, and a reactance $x_{ij}$ and a load power $P_D = [P_{d1}, P_{d2}, \ldots P_{dNbus}]$ between a node i and a node j in a system, $p_{di}$, being a load power of a corresponding node i;
   in step 1.2, performing sampling and amplification on a node load powers $p_{di}$, of nodes, which are collected, to acquire a sample $\hat{P}_D = [\hat{P}_{d1}, \hat{P}_{d2}, \ldots, \hat{P}_{dNbus}]$ and repeating the sampling and amplification for n times to acquire a training sample $$P_D = [\hat{P}_{d1}, \hat{P}_{d2}, \ldots, \hat{P}_{dNbus}]$$

the sampling method being used for uniform sampling with the node load powers $p_{di}$, as a center as shown below:

$$\hat{P}_{di} \in [(1-r_{di}) \times p_{di}, (1+r_{di}) \times p_{di}]$$

wherein $r_{di}$, is a sampling parameter of the node i; and
   step 2 specifically comprises:
   taking the training sample $\hat{p}_{di}$, as an input, outputting a corresponding feasibility sign $\hat{f}_{G1}$; and a dispatching solution $\hat{P}_{Gi} = [\hat{P}_{g1}, \hat{P}_{g2}, \ldots, \hat{P}_{gNgen}]$ by means of a traditional optimal power flow solver based on the optimization method; repeating the above process for each of the training sample to acquire corresponding labels $\hat{P}_G = [\hat{P}_{G1}, \hat{P}_{G2}, \ldots, \hat{P}_{Gn}]$ and $\hat{F}_G = [\hat{f}_{G1}, \hat{f}_{G2}, \ldots, \hat{f}_{Gn}]$ of all of the training data;
   preprocessing the input $\hat{P}_D$ and an output $\hat{P}_G$, of the training data to acquire a preprocessed input $\tilde{P}_D$ and an output $\tilde{P}_G$ of the training data;
   inputting the preprocessed input $\tilde{P}_D$, into the following deep learning neural network:

$$h_0 = \tilde{P}_D$$

$$H_i = \phi(W_i h_{i-1} + b_i)$$

wherein $h_0$ represents an original input of a neural network model, $h_i$ represents an output of a i hidden layer of a model, $W_i$; represents a weight of the i hidden layer, $b_i$ represents a deviation of the i hidden layer and $\phi(\cdot)$ represents an activation function;
   designing, aiming at the feasibility of the optimal power flow computation problem, the following output layer for learning:

$$F_G = \psi^{cls}(W_l^{cls} h_{i-1} + b_l^{cls}))$$

wherein $\psi^{cls}$ represents the activation function, $F_g$ represents a predicted value of a feasibility sign, $h_{i-1}$, represents an output of a last hidden layer, $W_l^{cls}$ represents an output layer weight of a classification problem and $b_l^{cls}$ represents an output layer deviation of the classification problem; and designing, aiming at the optimal solution of the optimal power flow computation problem, the following output layer for learning:

$$P_G = \psi^{reg}(W_l^{reg} h_{i-1} + b_l^{reg}))$$

wherein $\psi^{reg}$ represents the activation function, $P_g$ represents a predicted value of the dispatching solution, $h_{i-1}$ represents the output of the last hidden layer, $W_l^{reg}$ represents an output layer weight of a regression problem and $b_l^{reg}$ represents an output layer deviation of the regression problem.

2. The optimal power flow computation method based on the multi-task deep learning according to claim 1, wherein the step 4 specifically comprises:

setting a classification task, and measuring a difference between the predicted value $F_G$ and a true value $\hat{F}_G$ of the feasibility sign by means of a loss function:

$$loss_{cls} = L^{cls}(F_G, \hat{F}_G)$$

wherein $L^{cls}$ represents the loss function of the classification task;

setting a regression task, and measuring a difference between the predicted value $P_G$ and a true value $\tilde{P}_G$ of the dispatching solution by means of the loss function:

$$loss_{reg} = L^{reg}(P_G, \tilde{P}_G)$$

wherein $L^{reg}$ represents the loss function of the classification task;

acquiring a training loss of the multi-task deep learning model by means of a weighted summation:

$$loss = \omega_{cls} \cdot loss_{cls} + \omega_{reg} \cdot loss_{reg}$$

wherein $\omega_{cls}$ and $\omega_{reg}$ represent a weight of a classification task loss and a weight of a regression task loss respectively.

3. The optimal power flow computation method based on the multi-task deep learning according to claim 2, wherein the step 5 specifically comprises:

for given the state data of the power grid at any dispatching moment, outputting, by the multi-task deep learning model, the predicted value $f_G$ of the feasibility sign and a predicted value $p_G$ of the optimal solution; determining whether the predicted value $p_G$ is effective on the basis of the predicted value $f_G$; if so, taking the predicted value $p_G$ of the optimal solution, which is outputted, as the optimal dispatching solution to guide a dispatching operation of the power grid; and otherwise, abandoning the predicted value $p_G$, and outputting the early warning about the fact that the power grid cannot operate normally in a current system state.

\* \* \* \* \*